US008972255B2

(12) United States Patent
Leman et al.

(10) Patent No.: US 8,972,255 B2
(45) Date of Patent: Mar. 3, 2015

(54) METHOD AND DEVICE FOR CLASSIFYING BACKGROUND NOISE CONTAINED IN AN AUDIO SIGNAL

(75) Inventors: Adrien Leman, Lannion (FR); Julien Faure, Ploubezre (FR)

(73) Assignee: France Telecom, Paris (FR)

( * ) Notice: Subject to any disclaimer, the term of this patent is extended or adjusted under 35 U.S.C. 154(b) by 595 days.

(21) Appl. No.: 13/262,313

(22) PCT Filed: Mar. 22, 2010

(86) PCT No.: PCT/FR2010/050510
§ 371 (c)(1),
(2), (4) Date: Sep. 30, 2011

(87) PCT Pub. No.: WO2010/112728
PCT Pub. Date: Oct. 7, 2010

(65) Prior Publication Data
US 2012/0022864 A1    Jan. 26, 2012

(30) Foreign Application Priority Data

Mar. 31, 2009    (FR) ...................................... 09 52053

(51) Int. Cl.
*G10L 15/20*    (2006.01)
*G10L 21/02*    (2013.01)
(Continued)

(52) U.S. Cl.
CPC ................ *G10L 25/00* (2013.01); *G10L 15/20* (2013.01); *G10L 21/0208* (2013.01)
USPC ...... 704/233; 704/210; 704/226; 379/406.03; 379/406.05; 381/94.3

(58) Field of Classification Search
CPC ......... G06F 17/00; G10L 15/20; G10L 21/02; G10L 21/0208; G10L 25/00
USPC .............. 704/210, 233, 226; 379/406; 381/94
See application file for complete search history.

(56) References Cited

U.S. PATENT DOCUMENTS

| 5,727,072 A | 3/1998 | Raman |
| 5,757,937 A * | 5/1998 | Itoh et al. ..................... 381/94.3 |

(Continued)

OTHER PUBLICATIONS

Context awareness using environmental noise classification. Ma et al., Context awareness using environmental noise classification, Sep. 2003, 8th European Conference on Speech Communication and Technology, Eurospeech 2003—Interspeech 2003.*

(Continued)

*Primary Examiner* — Richemond Dorvil
*Assistant Examiner* — Seong Ah A Shin
(74) *Attorney, Agent, or Firm* — David D. Brush; Westman, Champlin & Koehler, P.A.

(57) ABSTRACT

Embodiments of methods and devices for classifying background noise contained in an audio signal are disclosed. In one embodiment, the device includes a module for extracting from the audio signal a background noise signal, termed the noise signal. Also included is a second that calculates a first parameter, termed the temporal indicator. The temporal indicator relates to the temporal evolution of the noise signal. The second module also calculates a second parameter, termed the frequency indicator. The frequency indicator relates to the frequency spectrum of the noise signal. Finally, the device includes a third module that classifies the background noise by selecting, as a function of the calculated values of the temporal indicator and of the frequency indicator, a class of background noise from among a predefined set of classes of background noise.

15 Claims, 4 Drawing Sheets

(51) Int. Cl.
  *G10L 25/00* (2013.01)
  *G10L 21/0208* (2013.01)

(56) References Cited

U.S. PATENT DOCUMENTS

| | | | |
|---|---|---|---|
| 6,415,253 B1* | 7/2002 | Johnson | 704/210 |
| 6,427,134 B1* | 7/2002 | Garner et al. | 704/233 |
| 6,782,361 B1 | 8/2004 | El-Maleh et al. | |
| 7,065,206 B2* | 6/2006 | Pan | 379/406.03 |
| 7,319,748 B2* | 1/2008 | Stenger | 379/406.05 |
| 8,143,620 B1* | 3/2012 | Malinowski et al. | 257/56 |
| 2011/0125497 A1* | 5/2011 | Unno | 704/233 |

OTHER PUBLICATIONS

El-Maleh et al., Frame-Level Noise Classification in Mobile Environments, , Mar. 1999. IEEE Conf. Acoustics, Speech, Signal Processing, (Phoenix, AZ), pp. 237-240.*

Sundaram et al., Audio scene segmentation using multiple features, models and time scales, Jun. 2000, IEEE Conf. Acoustics, Speech, Signal Processing, pp. 2441-2444.*

International Search Report and Written Opinion dated Jun. 8, 2010, for corresponding International Application No. PCT/FR2010/050510, filed Mar. 22, 2010.

Ma, L. et al.; "Context Awareness Using Environmental Noise Classification" Eurospeech (Sep. 1, 2003), pp. 2237-2240.

Sundaram, H. et al.; "Audio Scene Segmentation Using Multiple Features, Models and Time Scales," Acoustics, Speech, and Signal Processing, ICASSP '00, Proceeding S. 2000 IEEE International Conference Jun. 5-9, 2000. Piscataway, NJ, USA, v. 6. pp. 2441-2444.

Peltonen, V. et al.; "Computational Auditory Scene Recognition," Acoustics, Speech, and Signal Processing. Proceedings (ICASSP). Orlando, FL, May 13-17, 2002 New York, NY, vol. 2, pp. II-1941.

English translation of International Search Report dated Jun. 8, 2010, for corresponding International Application No. PCT/FR2010/050510, filed Mar. 22, 2010.

Thatphithakkul et al.: "Robust Speech Recognition Using PCA-Based Noise Classification", Department of Computer Engineering, King Mongkut's Institute of Technology Ladkrabang, Bangkok, Thailand, presented at the "SPECOM" conference, 2005.

El-Maleh et al.: "Frame Level Noise Classification in Mobile Environments", Proc. IEEE Conf. Acoustics, Speech, Signal Proc. (Phoenix, AZ), pp. 237-240, Mar. 1999.

Leman et al.: "Influence of Informational Content of Background Noise on Speech Quality Evaluation for VoIP Application", presented at the "Acoustics'08" conference, Paris, France, Jun. 29-Jul. 4, 2008, 6 pages.

* cited by examiner

METHOD AND DEVICE FOR CLASSIFYING BACKGROUND NOISE CONTAINED IN AN AUDIO SIGNAL

CROSS-REFERENCE TO RELATED APPLICATIONS

This application is a Section 371 National Stage Application of International Application No. PCT/FR2010/050510, filed Mar. 22, 2010 and published as WO 2010/112728 A1 on Oct. 7, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates in general to the processing of audio signals and notably audio signals transmitted in telecommunications systems. The disclosure relates in particular to a method and a device for classifying the background noise contained in an audio signal.

The disclosure applies notably to the speech signals transmitted during a telephone call over a communication network, for example a mobile telephony network or a telephony network over a switched network or over a packet network.

BACKGROUND OF THE DISCLOSURE

In acoustics and more particularly in the field of speech, the noise that is present in an audio signal may be defined, for example, by anything that can be of hindrance in the comprehension of the audio signal by a human being, or else by that which may be of hindrance to the result of a task of recognition or of discrimination between various types of signals (speech/music for example). The presence of noise in an audio signal can be disruptive because the noise can mask the specific features of the payload signal (speech or music for example). In certain cases, the background noise may be an element of the communication that can provide information that is useful to the listeners (the context of mobility, geographic location, sharing of ambiance).

In the field of voice communication, the noise included in a speech signal, termed "background noise", may include various noises: sounds originating from engines (motor vehicles, motorcycles), aircraft passing overhead, noises of conversation/murmurs—for example in a restaurant or cafe environment—, music and many other audible noises.

Since the arrival of mobile telephony, the possibility of communicating from any location has contributed to increasing the presence of background noise in the speech signals transmitted and consequently has made it necessary to process the background noise in order to preserve an acceptable level of communication quality.

Moreover, in addition to the noises coming from the environment in which the sound pick-up takes place, spurious noises, produced notably during the encoding and transmission of the audio signal over the network (packet loss, for example, in voice over IP), may also interact with the background noise. In this context, it is therefore possible to suppose that the perceived quality of the transmitted speech is dependent on the interaction between the various types of noise making up the background noise.

Thus, document [1]: "Influence of informational content of background noise on speech quality evaluation for VoIP application", by A. Leman, J. Faure and E. Parizet—an article presented at the "Acoustics'08" conference that was held in Paris from Jun. 29 to Jul. 4, 2008—describes subjective tests which not only show that the sound level of the background noises plays a dominant role in the evaluation of the voice quality in the context of a voice over IP (VoIP) application, but also demonstrate that the type of background noise (environmental noise, line noise, etc.) which is superposed on the voice signal (the payload signal) plays an important role during the evaluation of the voice quality of the communication.

The classification of noise in audio signals has already been the subject of known work. For example, document [2]: "Context awareness using environmental noise classification", by L. Ma, D. J. Smith and B. P. Milner—an article presented to the "Eurospeech" conference, 2003—describes a noise classification method based on a hidden Markov model (HMM). According to the method described, ten environmental noises (bar, beach, street, office, etc.) can be classified by using MFCC (Mel-Frequency Cepstral Coefficients) coefficients and derivative indicators (some thirty indicators in total), in order to characterize an audio signal. The indicators obtained are then applied to a hidden Markov model (HMM). The indicators used thus make it possible to classify 90% of the noises present in a signal. However, the aforementioned method is extremely costly in terms of processing time given the high number of indicators used.

Document [3]: "Robust speech recognition using PCA-based noise classification" by N. Thaphithakkul et al.—an article presented to the "SPECOM" conference, 2005—describes a method for classifying environmental noise using a principal component analysis (PCA), intended for voice recognition. According to the method described, four types of noises are classified (white noise, pink noise, vehicle noise, confused murmuring (babble)) using characteristic vectors consisting of normalized logarithmic spectra (NLS) which are then projected onto the principal components of a space originating from the learning by PCA. The classification is finally made by support vector machines (SVM). However, the classified noises are of too precise type, with easily identifiable frequency characteristics and, on the other hand, this technique is also quite costly in terms of processing resources.

Document [4]: "Frame-level noise classification in mobile environments" by K. El-Maleh et al.—which appeared in Proc. IEEE Conf. Acoustics, Speech, Signal Proc. (Phoenix, Ariz.), pp. 237-240, March 1999—describes a technique for classifying background noise in the context of mobile telephony; in particular four types of noises are classified: street, confused murmuring (babble), factory, bus. The characteristics used for the classification are the line spectral frequencies (LSF). Various types of classifiers using these characteristics are then compared, in particular a decision tree (DTC: decision tree classifier) and a quadratic Gaussian classifier (QGC). However, the latter technique also uses indicators (LSF) that are costly to compute unless placing oneself in the encoded and non-audio domain.

Therefore, the abovementioned noise classification techniques are complex and require considerable computing time notably because of the type and large number of parameters required to carry out the classification.

SUMMARY

The object of an exemplary embodiment of the invention is notably to propose a technique for classifying the background noise present in an audio signal, that is relatively simple to apply and that is not very costly in processing resources compared with the known methods, and, in particular, that requires processing resources compatible with the use of this technique in onboard applications, whether it involves, for example, using this technique in applications for measuring voice quality, or applications for processing the speech signal, such as noise reduction or voice recognition.

An embodiment of the present invention therefore relates, according to a first aspect, to a method for classifying the background noise contained in an audio signal. According to an embodiment of the invention, this method comprises the steps consisting in:

extracting from the audio signal a background noise signal, called the noise signal;

calculating a first parameter, called the time indicator, relating to the time evolution of the noise signal, and a second parameter, called the frequency indicator, relating to the frequency spectrum of the noise signal;

classifying the background noise contained in the audio signal amongst a predefined set of background noise classes, as a function of the values of the calculated time indicator and frequency indicator.

By using only two indicators (time and frequency indicators), the method for classifying background noises according to an embodiment of the invention is less costly in terms of computing time than the techniques for classifying audio signals according to the prior art, and therefore can be used in the context of real time applications, for example during real telephone calls. For example, embodiments of the invention may be combined with an onboard real-time noise-removal application in mobile or fixed communication terminals, making it possible to adapt the noise-removal technique used to the nature of the background noise.

According to one particular embodiment, the time indicator is obtained from a calculation of variation in the sound level of the noise signal, and the frequency indicator is obtained from a calculation of variation in the amplitude of the frequency spectrum of the noise signal. The combination of these two indicators makes it possible to obtain a low rate of classification errors, while computing them does not place much of a burden on computing resources.

According to one mode of application of the invention, the method comprises the steps consisting in:

comparing the value of the time indicator (IND_TMP) obtained for the noise signal with a first threshold (TH1), and determining, as a function of the result of this comparison, whether or not the noise signal is stationary;

when the noise signal is identified as not stationary, comparing the value of the frequency indicator with a second threshold (TH2), and determining, as a function of the result of this comparison, whether the noise signal belongs to a first class (CL1) or to a second class (CL2) of background noises;

when the noise signal is identified as stationary, comparing the value of the frequency indicator with a third threshold (TH3), and determining, as a function of the result of this comparison, whether the noise signal belongs to a third class (CL3) or to a fourth class (CL4) of background noises.

Moreover, in this mode of application, the set of classes obtained by a method of an embodiment of the invention illustratively comprises at least the following classes:

intelligible noise;
environmental noise;
hissing noise;
crackling noise.

The use of the aforementioned 3 thresholds TH1, TH2, TH3 in a simple classification tree structure makes it possible to rapidly classify a noise signal sample. Moreover, by calculating the class of a sample over windows of short duration, it is possible to obtain an update in real time of the class of background noise of the noise signal analyzed.

Correlatively, according to another embodiment, a device for classifying the background noise contained in an audio signal is provided, this device comprising:

a module for extracting from the audio signal a background noise signal, called the noise signal;

a module for calculating a first parameter, called the time indicator, relating to the time evolution of the noise signal, and a second parameter, called the frequency indicator, relating to the frequency spectrum of the noise signal;

a module for classifying the background noise contained in the audio signal amongst a predefined set of classes of background noises, as a function of the values of the calculated time indicator and frequency indicator.

According to another embodiment, a computer program on an information medium is provided, this program comprising instructions suitable for applying a method according to embodiments briefly defined above when the program is loaded onto and executed on a computer.

The advantages obtained by the aforementioned device for classifying background noise and computer program are identical to those mentioned above with respect to the method for classifying background noise according to embodiments of the invention.

BRIEF DESCRIPTION OF THE DRAWINGS

Embodiments of the invention will be better understood with the aid of the following detailed description made with reference to the appended drawings in which.

DETAILED DESCRIPTION OF ILLUSTRATIVE EMBODIMENTS

Figure 1:
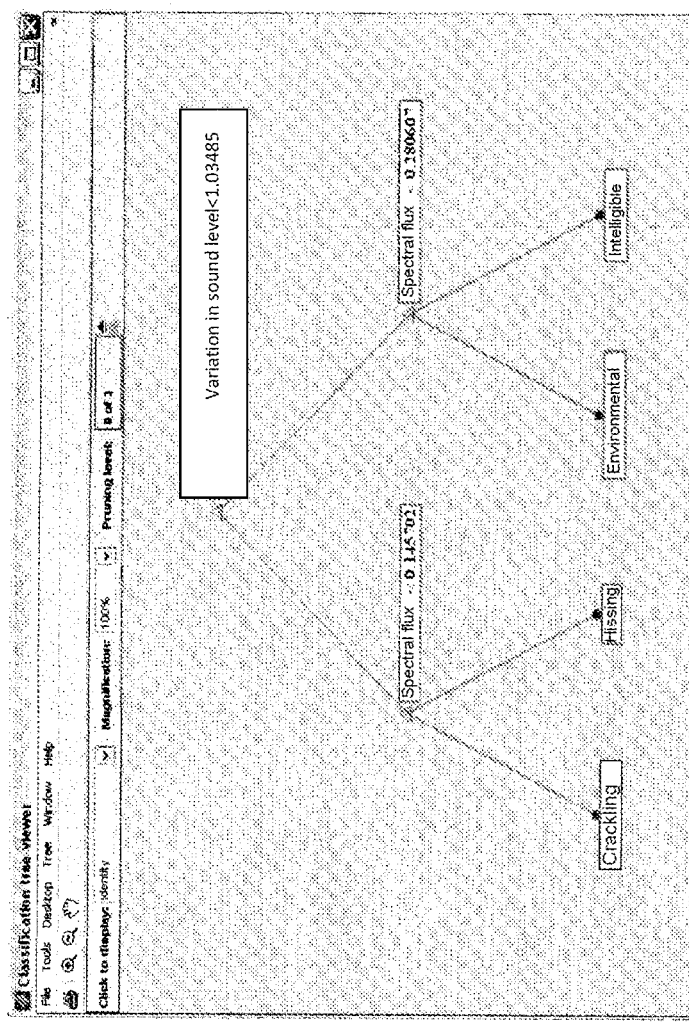
FIG. 1 represents a software program window displayed on a computer screen showing a selection tree obtained by learning to define a model for classifying background noises.

An embodiment of the invention proposes a method and a device for classifying the background noise contained in an audio signal. This method and this device are based on the application of a background noise classification model constructed in advance and on which the method of construction according to an embodiment of the invention is described below.

1) Construction of the Model for Classifying Background Noises

The construction of a model for classifying noise takes place conventionally according to three successive phases. The first phase consists in determining a sound base consisting of audio signals containing various background noises, each audio signal being labeled as belonging to a given class of noise. Then, during a second phase, a certain number of predefined characteristic parameters (here termed "indicators") forming a set of indicators are extracted from each sound sample of the base. Finally, during the third phase, called the learning phase, the set of pairs, each composed of the set of indicators and of the associated class of noise, is supplied to a learning engine designed to supply a classification model making it possible to classify any sound sample on the basis of determined indicators, the latter being selected as being the most pertinent amongst the various indicators used during the learning phase. The classification model obtained then makes it possible, on the basis of input indicators extracted from any sound sample (not forming part of the sound base), to supply a class of noise to which this sample belongs.

In document [1] cited above, it is demonstrated that the voice quality can be influenced by the significance of the noise in the telephony context. Thus, if users identify noise as coming from a sound source of the environment of the speaker, a certain indulgence is observed concerning the evaluation of the perceived quality. Two tests have made it possible to verify this, the first test concerning the interaction of the sound characteristics and levels of the background noises with the perceived voice quality, and the second test concerning the interaction of the background noise characteristics with the deteriorations due to the transmission of voice over IP. Starting with the results of the study set out in the aforementioned document, the inventors of embodiments of the present invention have chosen to define parameters (indicators) of an audio signal that make it possible to measure and quantify the significance of the background noise present in this signal and then to define a statistical method for classifying the background noise as a function of the chosen indicators.

Phase 1—Constructing a Sound Base of Audio Signals

For the construction of the classification model in one embodiment of the present invention, the sound base used consists, on the one hand, of the audio signals that have been used for the subjective tests described in document [1], and, on the other hand, of audio signals originating from public sound bases.

With respect to the audio signals originating from the subjective tests mentioned above, in the first test (see document [1], section 3.2), 152 sound samples are used. These samples are obtained from eight sentences of the same duration (8 seconds), selected from a standardized list of double sentences, produced by four speakers (two men and two women). These sentences are then mixed with six types of background noise (detailed below) at three different sound levels (loudness). Sentences with no background noise are also included. Then the set of samples is encoded with a G.711 codec.

In the second test (see document [1], section 4.1), the same sentences are mixed with the six types of background noise with an average loudness level, then four types of deterioration due to the transmission of voice over IP are introduced (G.711 codec with 0% and 3% of packet loss; G.729 codec with 0% and 3% of packet loss). In total, 192 sound samples are obtained according to the second test.

The six types of background noise used in the context of the aforementioned subjective tests are as follows:
  a pink noise considered to be the benchmark (stationary noise with −3 dB/octave of frequency content);
  a stationary speech noise (BPS), that is to say a random noise with a frequency content similar to the standardized human voice (stationary);
  an electric noise, that is to say a harmonic sound having a fundamental frequency of 50 Hz simulating a circuit noise (stationary);
  a city environmental noise with the presence of automobiles, audible horns, etc. (non-stationary);
  a restaurant environmental noise with the presence of babble, the clink of glasses, laughter, etc. (non-stationary);
  a sound of intelligible voice recorded from a TV source (non-stationary).

All the sounds are sampled at 8 kHz (16 bits), and an IRS (Intermediate Reference System) band-pass filter is used to simulate a real telephone network. The six types of noises cited above are repeated with deteriorations associated with the G.711 and G.729 encodings, with packet losses, and with several diffusion levels.

With respect to the audio signals originating from public sound bases used for supplementing the sound base, they involve 48 other audio signals comprising different noises, such as for example line, wind, motor vehicle, vacuum cleaner, hair dryer and babble noises, noises from nature (bird, flowing water, rain, etc.), and music.

These 48 noises were then subjected to six deterioration conditions as explained below.

Each noise is sampled at 8 kHz, filtered with the IRS8 tool, encoded and decoded according to the G.711 and G.729 recommendations in the case of the narrowband (300-3400 Hz), then each sound is sampled at 16 kHz, then filtered with the tool described in recommendation P.341 of the ITU-T ("Transmission characteristics for wideband (150-7000 Hz) digital hands-free telephony terminals", 1998), and finally encoded and decoded according to recommendation G.722 (wideband 50-7000 Hz). These three deteriorated conditions are then restored at two levels of restoration (signal-to-noise ratio: SNR=16 and 32). Each noise lasts for four seconds. Finally, a total of 288 different audio signals is obtained.

Thus, in one embodiment, the sound base used for developing the present invention consists in fact of 632 audio signals.

Each sound sample of the sound base is labeled manually in order to identify a class of background noise to which it belongs. The classes chosen were defined following the subjective tests mentioned in document [1] and more precisely were determined as a function of the indulgence with respect to the perceived noises, manifested by the subjects tested during the voice quality assessment as a function of the type of background noise (amongst the aforementioned 6 types).

Thus, four classes of background noise were selected:
  Class 1: "Intelligible" background noise—this is noise of an intelligible nature such as music, speech, etc. This class of background noise causes a high level of indulgence on the assessment of the perceived voice quality relative to a hissing noise of the same level.
  Class 2: "Environmental" background noise—these are noises having informational content and providing information on the environment of the speaker, such as city noises, restaurant noises and nature noises etc. This class of noise causes a slight indulgence on the assessment of the voice quality perceived by the users relative to a hissing noise of the same level.
  Class 3: "Hissing" background noise—these noises are of a stationary nature and do not contain any informational content; they are for example pink noise, stationary wind noise, stationary speech noise, etc.
  Class 4: "Crackling" background noise—these are noises containing no informational content, such as electrical noise, non-stationary sound-effect noise, etc. This class of noise causes a high deterioration of the voice quality perceived by the users, relative to a hissing noise of the same level.

Phase 2—Extracting Parameters of Audio Signals from the Sound Base

For each of the audio signals of the sound base, eight parameters or indicators known per se are calculated. These indicators are as follows:

(1) The correlation of the signal: this is an indicator using the Bravais-Pearson correlation coefficient applied between the complete signal and the same shifted signal of a digital sample.
(2) The zero crossing rate (ZCR) of the signal;
(3) The variation in the acoustic level of the signal;
(4) The spectral centroid of the signal;
(5) The spectral peak to valley height of the signal;
(6) The spectral flux of the signal;
(7) The spectral roll-off point of the signal;
(8) The harmonic coefficient of the signal.

Phase 3—Obtaining the Classification Model

The classification model according to one embodiment of the invention is obtained by learning with the aid of a decision tree (see FIG. 1), produced with the aid of the statistical tool called "classregtree" of the MATLAB® environment marketed by The MathWorks. The algorithm used is developed from techniques described in the book entitled "Classification and regression trees" by Leo Breiman et al., published by Chapman and Hall in 1993.

Each background noise sample of the sound base is informed by the aforementioned eight indicators and the class to which the sample belongs (1: intelligible; 2: environmental; 3: hissing; 4: crackling). The decision tree then calculates the various possible solutions in order to obtain an optimum classification that comes closest to the manually-labeled classes. During this learning phase, the most pertinent audio indicators are chosen and value thresholds associated with these indicators are defined, these thresholds making it possible to separate the various classes and subclasses of background noise.

During the learning phase, 500 background noises of different types are chosen at random from the 632 of the sound base. The result of the classification obtained by learning is shown in FIG. 1.

As can be seen in the decision tree as shown in FIG. 1, the resulting classification uses only two indicators out of the initial eight in order to classify the 500 background noises of the learning phase in the four predefined classes. The selected indicators are the indicators (3) and (6) from the list introduced above and represent respectively the variation in acoustic level and the spectral flux of the background noise signals.

As shown in FIG. 1, the classification model obtained by learning begins with separating the background noises as a function of their stationarity. This stationarity is revealed by the time indicator characteristic of the variation in acoustic level (indicator (3)). Thus, if this indicator has a value below a first threshold—TH1=1.03485—the background noise is considered to be stationary (the left branch), otherwise the background noise is considered to be non-stationary (the right branch). Then, the frequency indicator characteristic of the spectral flux (indicator (6)) in its turn filters each of the two categories (stationary/non-stationary) selected with the indicator (3).

Thus, when the noise signal is considered to be non-stationary, if the frequency indicator is below a second threshold—TH2=0.280607—the noise signal belongs to the "environmental" class, otherwise the noise signal belongs to the "intelligible" class. Moreover, when the noise signal is considered to be stationary, if the frequency indicator (indicator (6), spectral flux) is below a third threshold—TH3=0.145702—the noise signal belongs to the "crackling" class, otherwise the noise signal belongs to the "hissing" class.

The selection tree obtained according to an embodiment of the invention (FIG. 1) with the aforementioned two indicators has made it possible to correctly classify 86.2% of the background noise signals out of the 500 audio signals subjected to the learning phase. More precisely, the proportions of correct classification obtained for each class are as follows:

100% for the "crackling" class,
96.4% for the "hissing" class,
79.2% for the "environmental" class,
95.9% for the "intelligible" class.

It is possible to note that the "environmental" class obtains a lower correct classification result than for the other classes. This result is due to the differentiation between "hissing" and "environmental" noises which can sometimes be difficult to achieve, due to the resemblance of certain sounds that can be placed in both of these classes at the same time, for example sounds such as the noise of the wind or the noise of a hair-dryer.

Defined below in greater detail are the indicators chosen for the classification model according to embodiments of the invention.

The time indicator, hereinafter called "IND_TMP" in the description, and characteristic of the variation in sound level of any noise signal is defined by the standard deviation of the power values of all the considered frames of the signal. First, a power value is determined for each of the frames. Each frame consists of 512 samples, with an overlap between the successive frames of 256 samples. For a sampling frequency of 8000 Hz, this corresponds to a period of 64 ms (milliseconds) per frame, with an overlap of 32 ms. This 50% overlap is used to obtain continuity between successive frames, as defined in document [5]: "P.56 Mesure objective du niveau vocal actif" [P.56 Objective measurement of active voice level], ITU-T recommendation, 1993.

When the noise to be classified is longer than a frame, the acoustic power value for each of the frames can be defined by the following mathematical formula:

$$P(\text{frame}) = 10\log\left(\frac{1}{L_{frame}} \sum_{i=1}^{L_{frame}} x_i^2\right) \quad (1)$$

Where: "frame" is the number of the frame to be evaluated; "Lframe" is the length of the frame (512 samples); "xi" is the amplitude of the sample i; "log" is the decimal logarithm. This is how the logarithm of the calculated mean is calculated to obtain a power value per frame.

The value of the time indicator "IND_TMP" of the background noise in question is then defined by the standard deviation of all the power values obtained, by the following relation:

$$\text{IND\_TMP} = \sqrt{\frac{1}{N frame} \sum_{i=1}^{N frame} (P_i - \langle P \rangle)^2} \quad (2)$$

Where: Nframe is the number of frames present in the background noise in question; Pi is the power value for the frame i; and <P> is the mean power over all the frames.

According to the time indicator IND_TMP, the more non-stationary a sound is the higher the value obtained for this indicator will be.

The frequency indicator, called in the rest of the description "IND_FRQ" and characteristic of the spectral flux of the noise signal, is calculated on the basis of the Power Spectral Density (PSD) of the signal. The PSD of a signal—originating from the Fourrier transform of the autocorrelation function of the signal—makes it possible to characterize the spectral envelope of the signal in order to obtain information on the frequency content of the signal at a given moment, such as for example the formants, the harmonics, etc. According to the embodiment shown, this indicator is determined per frame of 256 samples, corresponding to a duration of 32 ms for a sampling frequency of 8 KHz. There is no frame overlap, unlike the time indicator.

The spectral flux (SF), also called "spectral amplitude variation", is a measurement making it possible to evaluate the speed of variation of a power spectrum of a signal over time. This indicator is calculated on the basis of the normalized crosscorrelation between two successive spectral amplitudes $a_k(t-1)$ and $a_k(t)$. The spectral flux (SF) can be defined by the following mathematical formula:

$$SF(\text{frame}) = 1 - \frac{\sum_k a_k(t-1) \cdot a_k(t)}{\sqrt{\sum_k a_k(t-1)^2}\sqrt{\sum_k a_k(t)^2}} \quad (3)$$

Where: "k" is an index representing the various frequency components, and "t" is an index representing the successive frames without overlap, consisting of 256 samples each.

In other words, a value of the spectral flux (SF) corresponds to the amplitude difference of the spectral vector between two successive frames. This value is close to zero if the successive spectra are similar and is close to 1 for successive spectra that are very different. The value of the spectral flux is high for a music signal, because a musical signal varies greatly from one frame to the other. For speech, with the alternation of stability periods (vowel) and transitions (consonant-vowel), the measurement of the spectral flux takes very different values and varies greatly over a sentence.

When the noise to be classified is longer than a frame, the final expression chosen for the spectral flux is defined as the mean of the values of all the frames of the signal as defined in the following equation:

$$SF_{tot} = \frac{1}{Nframe} \sum_{i=1}^{Nframe} SF(i) \quad (4)$$

2) Using the Background Noise Classification Model

The classification model in accordance with an embodiment of the invention, obtained as explained above, is used according to an embodiment of the invention to determine, on the basis of indicators extracted from any noisy audio signal, the class of noise to which this noisy signal belongs out of the set of classes defined for the classification model.

Figure 2A:
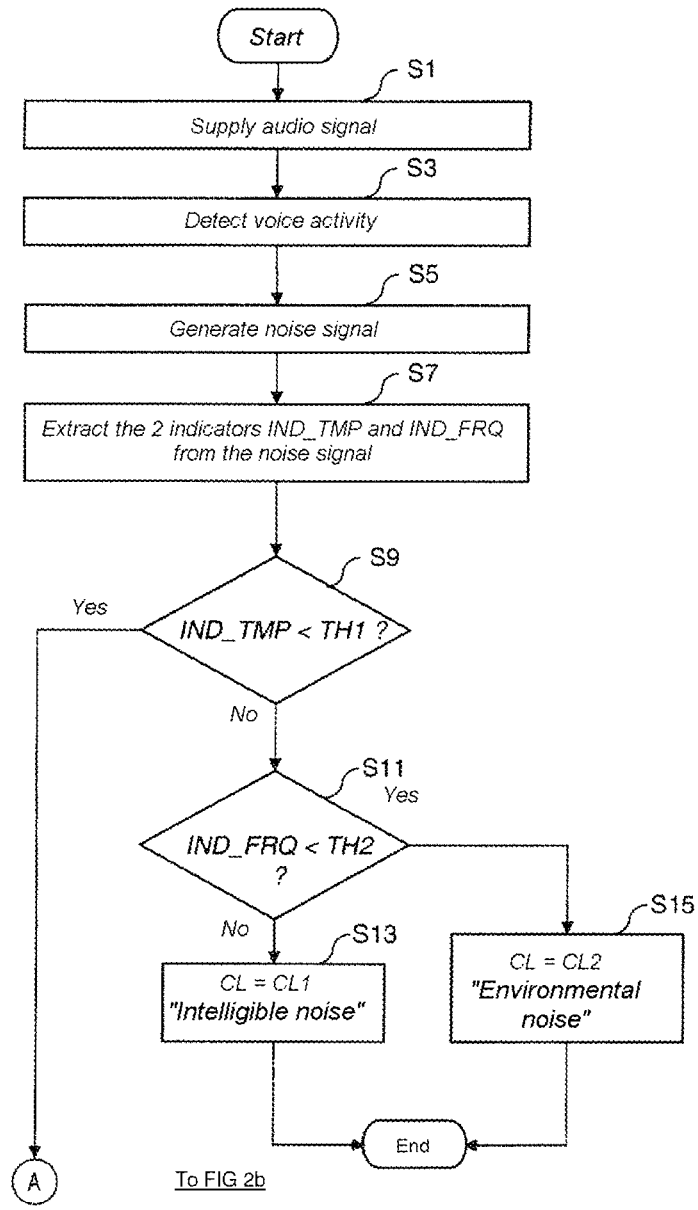
FIGS. 2a and 2b represent a flow chart illustrating a method for classifying background noises using the classification model obtained.
Figure 2B:
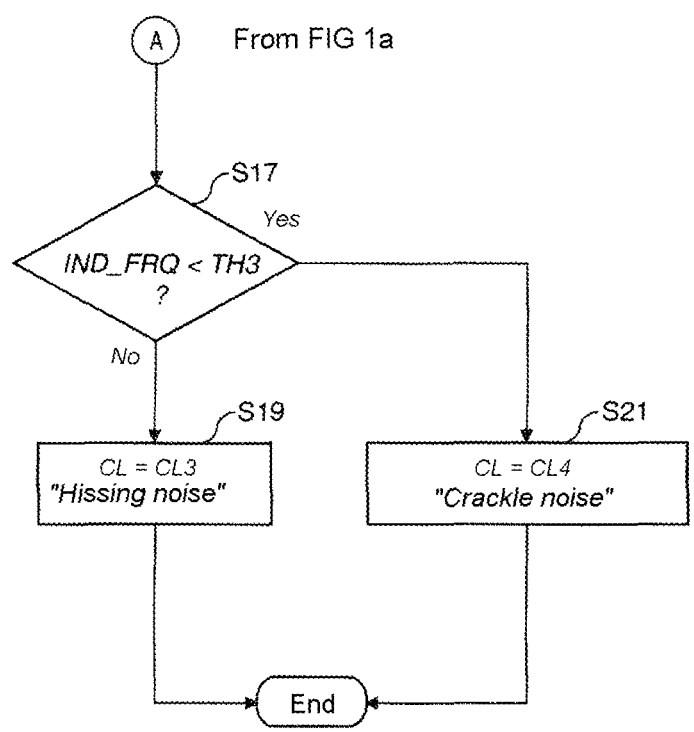

Such a method for classifying background noises according to an embodiment of the invention is illustrated in its principle in FIGS. 2a and 2b. As shown in FIG. 2a, the first step S1 consists in obtaining an audio signal which, in the embodiment explained here, is a speech signal obtained in analog or digital form. In this embodiment, as illustrated by step S3, a detection of voice activity (DVA) operation is then applied to the speech signal. The object of this detection of voice activity is to separate in the input audio signal the periods of the signal containing speech, possibly noisy, from the periods of the signal containing no speech (periods of silence), consequently being able to contain noise only. Thus, during this step, the active zones of the signal, that is to say having the noisy voice message, are separated from the noisy inactive zones. In practice, in this embodiment, the voice activity detection technique that is used is that described in document [5] mentioned above ("P.56 Mesure objective du niveau vocal actif" [P.56 Objective measurement of active voice level], ITU-T recommendation, 1993).

In summary, the principle of the DVA technique used consists in:
- detecting the signal envelope,
- comparing the signal envelope with a threshold that is fixed, taking account of a speech maintenance time,
- determining the signal frames in which the envelope is situated above the threshold (DVA=1 for the active frames) and below the threshold (DVA=0 for the background noise). This threshold is set at 15.9 dB (decibels) below the mean active voice level (signal power over the active frames).

Once the voice detection has been carried out on the audio signal, the generated background noise signal (step S5) is the signal consisting of the audio signal periods for which the voice activity detection result is zero.

Once the noise signal is generated, the two indicators mentioned above (time indicator IND_TMP and frequency indicator IND_FRQ), which were selected when obtaining the classification model (learning phase), are extracted from the noise signal during step S7.

Then the tests S9, S11 (FIG. 2a) and S17 (FIG. 2b) and the associated decision branches correspond to the decision tree described above with respect to FIG. 1. Thus, in step S9 the value of the time indicator (IND_TMP) obtained for the noise signal is compared with the first threshold TH1 mentioned above. If the value of the time indicator is higher than the threshold TH1 (S9, no), the noise signal is of the non-stationary type and then the test of step S11 is applied.

During the test S11, the frequency indicator (IND_FRQ) this time is compared with the second threshold TH2 mentioned above. If the indicator IND_FRQ is higher (S11, no) than the threshold TH2, the class (CL) of the noise signal is determined (step S13) to be CL1: "intelligible noise"; otherwise the class of the noise signal is determined (step S15) to be CL2: "environmental noise". The classification of the analyzed noise signal is then complete.

During the initial test S9, if the value of the time indicator is below the threshold TH1 (S9, yes) the noise signal is of the stationary type and the test of S17 (FIG. 1b) is applied. In test S17, the value of the frequency indicator IND_FRQ is compared with the third threshold TH3 (defined above). If the indicator IND_FRQ is higher (S17, no) than the threshold TH3, the class (CL) of the noise signal is determined (step S19) to be CL3: "hissing noise"; otherwise the class of the noise signal is determined (step S21) to be CL4: "crackling noise". The classification of the analyzed noise signal is then complete.

Figure 3:
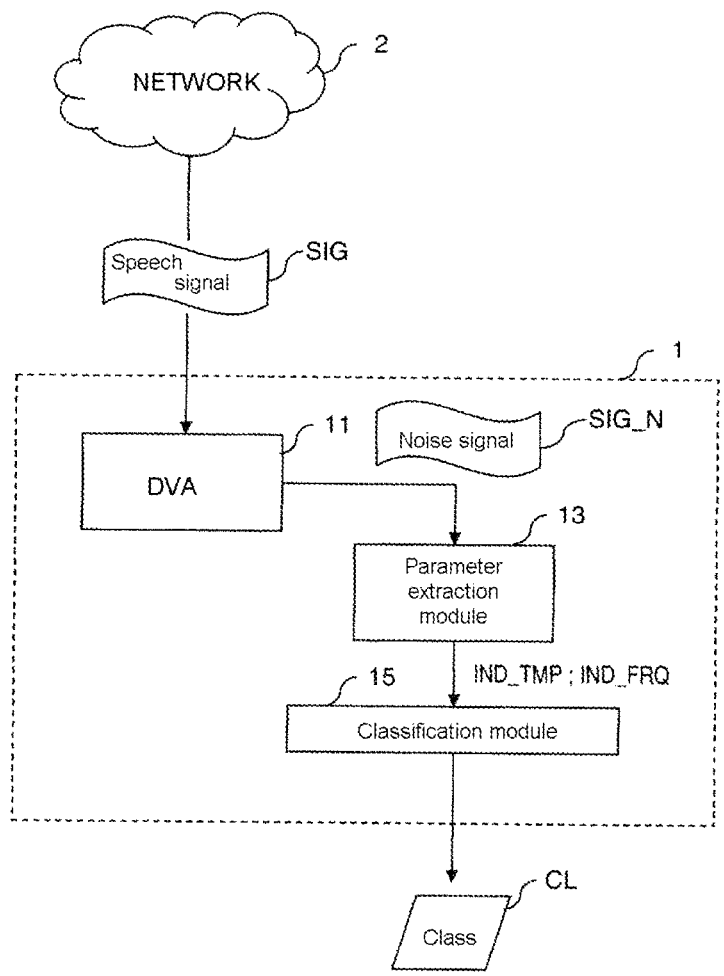
FIG. 3 represents a functional diagram of a device for classifying background noises.

In connection with FIG. 3, a description will now be given in a functional manner of the device for classifying background noises according to an embodiment of the invention, which is suitable for applying the classification method according to an embodiment of the invention that has just been described above. As shown in FIG. 3, this device (1) for classifying the background noise contained in an audio signal comprises a module 11 for extracting from the audio signal (SIG) a background noise signal (SIG_N), called the noise signal. According to the embodiment explained, this module is in practice a voice activity detection module. The module DVA 11 then supplies a noise signal SIG_N that is delivered as an input to a parameter-extraction module 13, that is to say for calculating the parameters made up of the time and frequency indicators, respectively IND_TMP and IND_FRQ.

The calculated indicators are then supplied to a classification module 15 which implements the classification model according to an embodiment of the invention described above and which determines as a function of the values of the indicators used the background noise class (CL) to which the noise signal SIG_N belongs, according to the algorithm described in connection with FIGS. 2a and 2b.

The input speech signal SIG of the device 1 for classifying background noises according to an embodiment of the invention may be supplied to the device 1 from a communication network 2 such as a voice over IP network for example. The classification device 1 according to an embodiment of the invention will then be able to be a module that is integrated, for example, into a communication terminal as an input stage of a noise-reduction module. In such an application of an embodiment of the invention, the result of classifying the background noise that is present in the speech signal can then influence the implementation of an operation to remove the noise from the audio signal, as a function of the type of background noise determined previously.

Thus, for example, if the background noise is determined to be intelligible (CL1) or relating to the environment (CL2) of the remote speaker, this background noise can be judged to be payload noise since it provides the listener—that is to say the user of the terminal—with information on the context (restaurant, location, etc.) of the remote speaker's call. Accordingly, the decision can be made to retain this background noise in the audio signal and therefore not to remove it by means of the noise removal module.

In practice, the device for classifying background noises according to an embodiment of the invention is applied in the form of software means, that is to say of computer program modules, performing the functions described in connection with FIGS. 2a, 2b and 3.

These program modules are applied when they are loaded onto and executed on a computer or information technology device. Such an information technology device may also consist of any system with a processor, incorporated into a communication terminal or into an item of communication network equipment.

It will also be noted that a computer program according to an embodiment of the invention, the purpose of which is the application of an embodiment of the invention when it is executed by an appropriate information technology system, can be stored on an information medium of various types. Specifically, such an information medium may consist of any entity or device capable of storing a program according to an embodiment of the invention.

For example, the medium in question may comprise a hardware storage means, such as a memory, for example a CD ROM or a microelectronic circuit memory of the ROM or RAM type, or else a magnetic storage means, for example a hard disk.

From a design point of view, a computer program according to an embodiment of the invention may use any programming language and take the form of source code, object code, or intermediate code between source code and object code (for example, a partially compiled form), or may be in any other desirable form for implementing a method according to an embodiment of the invention.

Although the present disclosure has been described with reference to one or more examples, workers skilled in the art will recognize that changes may be made in form and detail without departing from the scope of the disclosure and/or the appended claims.

The invention claimed is:

1. A method for classifying a background noise contained in an audio signal, the method comprising:
  extracting from the audio signal a background noise signal, the background noise signal being a noise signal;
  utilizing a computer processor to calculate a first parameter relating to a time evolution of the noise signal, and a second parameter relating to a frequency spectrum of the noise signal, the first parameter being a time indicator and the second parameter being a frequency indicator;
  classifying the background noise contained in the audio signal amongst a predefined set of background noise classes, as a function of values of the calculated time indicator and frequency indicator, wherein, in order to classify the background noise, the method further comprises:
  performing a first comparison by comparing the value of the time indicator calculated for the noise signal with a first threshold, and determining, as a function of the result of the first comparison, whether or not the noise signal is stationary;
  when the noise signal is identified as not stationary, performing a second comparison by comparing the value of the frequency indicator with a second threshold, and determining, as a function of the result of the second comparison, whether the noise signal belongs to a first class or to a second class of background noises; and
  when the noise signal is identified as stationary, performing a third comparison by comparing the value of the frequency indicator with a third threshold, and determining, as a function of the result of the third comparison, whether the noise signal belongs to a third class or to a fourth class of background noises.

2. The method as claimed in claim 1, wherein the time indicator is obtained from a calculation of variation in sound level of the noise signal.

3. The method as claimed in claim 2, wherein the frequency indicator is obtained from a calculation of variation in amplitude of the frequency spectrum of the noise signal.

4. The method of claim 2, wherein the audio signal is a speech signal and wherein the noise signal is extracted by applying to the speech signal an operation for detecting voice activity, zones of the speech signal that have no voice activity constituting the noise signal.

5. The method as claimed in claim 1, wherein the frequency indicator is obtained from a calculation of variation in amplitude of the frequency spectrum of the noise signal.

6. The method of claim 5, wherein the audio signal is a speech signal and wherein the noise signal is extracted by applying to the speech signal an operation for detecting voice activity, zones of the speech signal that have no voice activity constituting the noise signal.

7. The method as claimed in claim 1, wherein the set of classes comprises at least one class selected from a set of classes that includes:
  intelligible noise;
  environmental noise;
  hissing noise; and
  crackling noise.

8. The method of claim 7, wherein the audio signal is a speech signal and wherein the noise signal is extracted by applying to the speech signal an operation for detecting voice activity, zones of the speech signal that have no voice activity constituting the noise signal.

9. The method of claim 1, wherein the audio signal is a speech signal and wherein the noise signal is extracted by applying to the speech signal an operation for detecting voice activity, zones of the speech signal that have no voice activity constituting the noise signal.

10. The use of a method for classifying the background noise contained in an audio signal, as claimed in claim 1, in order to influence whether or not a noise removal operation is applied to the audio signal, as a function of the result of the classification obtained by means of said method.

11. The method of claim 1, wherein classifying the background noise comprises classifying the background noise as a function of solely the values of the calculated time indicator and frequency indicator.

12. A device for classifying a background noise contained in an audio signal, the device comprising:
    an extraction component that extracts from the audio signal a background noise signal, the background noise signal being a noise signal;
    a calculation component that utilizes a computer processor to calculate a first parameter relating to a time evolution of the noise signal and a second parameter relating to a frequency spectrum of the noise signal, the first parameter being a time indicator and the second parameter being a frequency indicator; and
    a classification component that classifies the background noise contained in the audio signal amongst a predefined set of classes of background noises, as a function of the values of the calculated time and frequency indicators, the classification component being configured to perform the following steps:
        performing a first comparison by comparing the value of the time indicator calculated for the noise signal with a first threshold, and determining, as a function of the result of the first comparison, whether or not the noise signal is stationary;
        when the noise signal is identified as not stationary, performing a second comparison by comparing the value of the frequency indicator with a second threshold, and determining, as a function of the result of the second comparison, whether the noise signal belongs to a first class or to a second class of background noises; and
        when the noise signal is identified as stationary, performing a third comparison by comparing the value of the frequency indicator with a third threshold, and determining, as a function of the result of the third comparison, whether the noise signal belongs to a third class or to a fourth class of background noises.

13. The device of claim 12, wherein the classifying component classifies the background noise as a function of solely the values of the calculated time indicator and frequency indicator.

14. A non-transitory computer-readable medium comprising a computer program stored thereon and comprising program code instructions for execution of a method for classifying a background noise contained in an audio signal, wherein when the program code instructions are executed by a computer processor, the computer processor executes the method, the method comprising:
    extracting from the audio signal a background noise signal, the background noise signal being a noise signal;
    utilizing a computer processor to calculate a first parameter relating to a time evolution of the noise signal, and a second parameter relating to a frequency spectrum of the noise signal, the first parameter being a time indicator and the second parameter being a frequency indicator;
    classifying the background noise contained in the audio signal amongst a predefined set of background noise classes, as a function of values of the calculated time indicator and frequency indicator, wherein, in order to classify the background noise, the method further comprises:
    performing a first comparison by comparing the value of the time indicator calculated for the noise signal with a first threshold, and determining, as a function of the result of the first comparison, whether or not the noise signal is stationary;
    when the noise signal is identified as not stationary, performing a second comparison by comparing the value of the frequency indicator with a second threshold, and determining, as a function of the result of the second comparison, whether the noise signal belongs to a first class or to a second class of background noises; and
    when the noise signal is identified as stationary, performing a third comparison by comparing the value of the frequency indicator with a third threshold, and determining, as a function of the result of the third comparison, whether the noise signal belongs to a third class or to a fourth class of background noises.

15. The non-transitory computer-readable medium of claim 14, wherein classifying the background noise comprises classifying the background noise as a function of solely the values of the calculated time indicator and frequency indicator.

* * * * *